United States Patent [19]

Edlin et al.

[11] Patent Number: 4,724,321

[45] Date of Patent: Feb. 9, 1988

[54] BEAM INTENSITY MONITOR FOR A HIGH ENERGY PARTICLE BEAM SYSTEM

[75] Inventors: George R. Edlin; Brian R. Strickland; Thomas G. Roberts, all of Huntsville, Ala.

[73] Assignee: The United States of America as represented by the Secretary of the Army, Washington, D.C.

[21] Appl. No.: 897,693

[22] Filed: Aug. 11, 1986

[51] Int. Cl.$^4$ .......................... G01J 1/58; G01T 1/10
[52] U.S. Cl. ............................... 250/336.1; 250/458.1
[58] Field of Search ............... 250/336.1, 458.1, 484.1, 250/486.1, 349; 324/71.3; 338/0.15; 324/0.65; 358/111, 93

[56] References Cited

U.S. PATENT DOCUMENTS 4,570,070 2/1986 Tabei .................................. 250/372

OTHER PUBLICATIONS

V. M. Kuz'michev, Fast Response Meter for Measuring the Power of $CO_2$ Laser Radiation, 5-1975, 1337.

Primary Examiner—Janice A. Howell
Attorney, Agent, or Firm—John C. Garvin, Jr.; Freddie M. Bush

[57] ABSTRACT

A beam intensity monitor for monitoring high energy particle beams by placing the monitor across the path of a particle beam to intercept a small portion of the particle beam as it passes therethrough. The monitor comprises primarily a four resistor bridge arrangement driven by a power source and utilizing a voltmeter as a detector for changes in bridge voltage. One of the four resistors functions as the sensor for the monitor. The sensor comprises an elongated wire resistance that is folded, coiled or otherwise shaped to encompass an area or region through which the neutral particle beam is directed to pass. The resistance wire is heated by passage of the particle beam therethrough, being impacted by approximately 0.1% of the beam, causing the bridge to become unbalanced. The magnitude of the voltage produced is proportional to the power in the beam. Simultaneously, phosphor beads attached to the elongated wire are also struck by the particles in the beam. These particles cause the phosphor to fluoresce and the light which is emitted from the phosphors is observed by a television camera, providing a measure of the spatial distribution of the particles within the beam.

4 Claims, 2 Drawing Figures

BEAM INTENSITY MONITOR FOR A HIGH ENERGY PARTICLE BEAM SYSTEM

DEDICATORY CLAUSE

The invention described herein may be manufactured, used, and licensed by or for the Government for governmental purposes without the payment to us of any royalties thereon.

BACKGROUND OF THE INVENTION

In most high energy neutral particle beam applications it is desirable to know the output power from the system as a function of both space and time. This is especially true for applications in outer space such as those contemplated for strategic defense against intercontinental ballistic missiles. For these outer space applications a device does not currently exist for measuring this output power. Thus, a need still exists for a monitoring device that is simple, easily built and maintained, easy to use and which measures both the total power in a particle beam and the spatial distribution of the particles within the beam.

SUMMARY OF THE INVENTION

A beam intensity monitor is disclosed for a high energy particle beam system that measures the total output power of the system and the spatial distribution of the particles in the beam. The monitor device utilizes a resistance wire power meter having small phosphor beads attached at intervals along the resistance wire. To obtain the spatial distribution of the particles in the beam, the beads are observed by a television camera. Similarly, to obtain the total power, the change of resistance in the resistance wire is measured. The resistance wire and phosphor beads are placed across the path of the beam such that the wire and beads will block a very small portion of the particles in the beam. Monitoring the phosphors and temperature change in the wire allows the spatial resolution and power to be determined. The particular manner or arrangement in which the resistance wire is mounted and the size of the interval between the beads determines the degree of spatial resolution obtained.

DESCRIPTION OF THE PREFERRED EMBODiMENT

Figure 1:
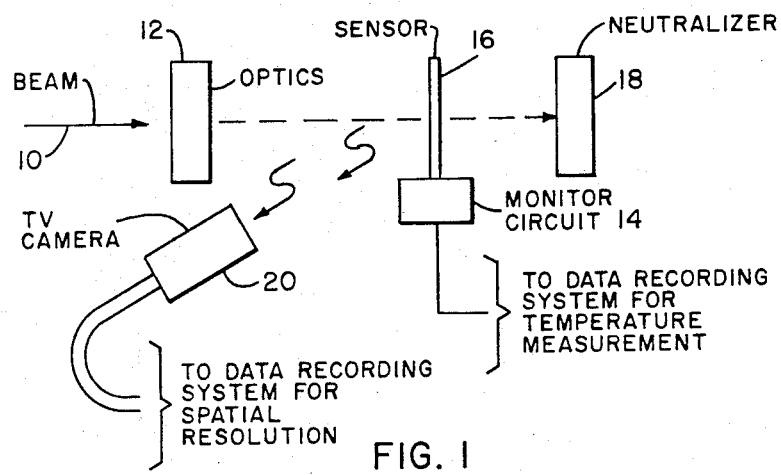
FIG. 1 is a simplified, diagrammatic view of a preferred embodiment of the beam intensity monitor.

Referring now to the drawings, wherein like numbers refer to like parts, FIG. 1 discloses a system wherein the beam intensity monitor is employed. An output particle beam 10 from a beam source (not shown) is directed through the final output optic stage 12 of the beam source and subsequently coupled through a sensor 16 of a beam intensity monitor circuit 14 before being coupled to a neutralizer 18. A television (TV) camera 20 is positioned to observe the surface of sensor 16 that is placed across tne path of beam 10 for detecting the characteristics of the beam as it passes through sensor 16, as will be explained hereinbelow in more detail. The observed beam energy mey be recorded on film by camera 20 or other data recording means may be used for subsequently displaying the observed spatial resolution of the beam as sensed by the sensor 16. Additionally, monitor circuit 14 is coupled to data recording system for temperature measurement indicative of the power present in the beam.

While sensor 16 is shown disposed between optics 12 and neutralizer 18 where it monitors the properties of the high energy charged partial beam, it could be disposed elsewhere within the beam path. For example, the sensor may be placed after the neutralizer where it can monitor the properties of the neutralized beam.

Figure 2:
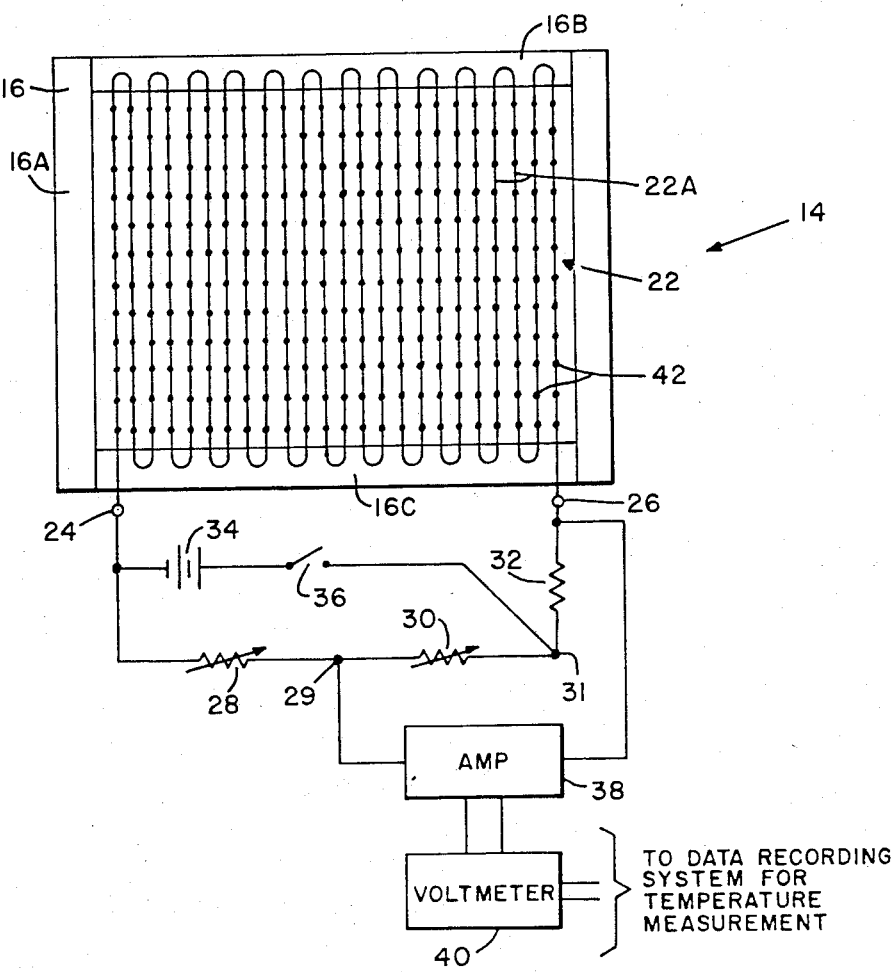
FIG. 2 is a partial schematic-partial block diagram of the beam intensity monitor showing the power meter circuit with attached phosphors from which the total power and spatial distribution are obtained.

FIG. 2 discloses the monitor circuit 14 to include both the sensor 16 and additional structure as set forth hereinbelow. Sensor 16 comprises a rectangular frame 16A having a resistance wire 22 arrayed therein through which the incoming beam 10 must pass. Wire 22 is looped at respective ends 16B and 16C of support structure 16A so that respective parallal strands 22A of the wire are uniformily spaced apart to form a parallal array through which the beam must pass. Terminal ends 24 and 26 of the wire are series coupled together through a rheostat 28, a rheostat 30, and a resistance 32. Rheostats or variable resistors 28 and 30 are connected at junction 29; and rheostat 30 and resistance 32 are connected at junction 31 to provide a resistance bridge, with resistance wire 22 forming one leg of the bridge. A direct current power source 34 is coupled in series with a switch 36 between point 31 and wire end portion 24 of the resistance wire 22. An amplifier 38 is coupled between junction 29 and wire end portion 26 of resistance wire 22 to complete the bridge circuit. Amplifier 38 is further coupled to a voltmeter 40, with amplifier 38 and meter 40 functioning as a detection system for indicating the balanced or unbalanced state of the bridge. When the bridge is balanced, there is no voltage developed. between point 29 and terminal 26; however, when a high energy particle beam is allowed to pass through the resistance wire 22, the wire will block a very small portion of the particles in the beam. The blocked energy is on the order of 0.1 percent or less of the beam. This energy collected by the wires increases the temperature of wire 22 thereby causing the resistance in the wire to also increase. The increased resistance unbalances the bridge producing a potential difference between terminal 26 and point 29. This potential difference is proportional to the increase in resistance of wire 22 and, therefore, proportional to the power in the beam. Subsequently, this signal is amplified by amplifier 38 and measured by voltmeter 40. The measurement may be displayed by the voltmeter or further coupled to data recording circuitry. The data recording system or circuitry for the TV camera 20 and for the monitor circuit 14 as shown in FIG. 1 respectively may be a simple television recorded film for viewing on a television screen and a graph recorder, or may be more complex depending on the data reduction desired. For example, the data recording system may include reduction to a digital format and display by a computer assisted control. However, such operation and control is routine and outside the intent of this inventive disclosure and is accordingly not addressed. Regardless of the data reduction and recording system utilized, measurement of the change of resistance in the wire yields the power in the beam integrated over the spatial extent of the beam.

As also shown in FIG. 2 a plurality of phosphor beads 42 are attached along the length of wire 22. These phosphor beads are spaced apart along the length of each wire portion 22A. While the beads may be arranged in uniform columns and rows as shown in FIG. 2, uniformity of the arrangement is not absolutely necessary for operation of the system. Additionally, other shapes such as a circular, spiral pattern for wire 22 and beads 42 thereon is also viable. During operation, when the neutral particle beam passes through sensor 16 some of the beam particles strike the small phosphor beads 42. These beads will fluoresce or scintillate, producing a light output from each bead that is proportional to the rate at which particles hit them. Thus, a pattern of light is produced which is a measure of the spatial distribution in the particle beam. This spatial distribution or pattern is observed by the TV camera 20 and recorded or otherwise displayed on data recording circuitry. Typically, the phosphor beads 42 may be the same as phosphors used on black and white or color television tubes, or the beads may be the same as fast scintillation crystals used with photo multiplier tubes. When a TV monitor is used to observe the spatial distribution in the particle beam, the TV phosphors are desired. However, in the event that response times faster than TV framing rates is desired an image converter tube may be used in the television circuit allowing the faster, scintillation crystals to be used as beads 42.

In its simplest form the resistance wire 22 may be made of any convenient material such as tungsten or stainless steel. The wire may be cylindrical and the beads may be stranded on the wire through apertures (holes) through each bead. Wire 22 may be thin as only 1 or 2 mills thick. Varying the diameter or thickness of the wire affects the temperature rise per second within the wire when it is exposed to the high energy particle beam. Thus, for a given energy of the particles within the beam, a linear effect occurs. For a given length of wire 22, the cross-section and therefore, the mass vary with the square of the radius of the wire ($R^2$) However, the surface area as seen by the beam and, therefore, the portion of the beam intercepted by the wire varies with the radius, R, of wire. Thus, the linear effect occurs and the temperature rise per second varies according to the inverse of the radius ($R^{-1}$). These factors or relationships are used in selecting the size of wire 22 for use in the power meter or monitor and to support the phosphor beads 42. For example, using tungsten wire as wire 22 and with a 250 mega electronvolt (MeV), 10 microamperes/$cm^2$ beam of hydrogen atoms (H) or hydrogen ions ($H^-$), the diameter of wire 22 may be 2 mills ($5 \times 10^{-5}$ m). This wire selection size holds the temperature rise within the wire to less than 50° Kelvin (K.) per second. The density and specific heats of other materials considered for wire 22 must be considered in determining the size of wire to be used.

Alternative to use of a cylindrical wire, wire 22 may also be a narrow ribbon with the edge of each section of ribbon turned toward the beam and the width or side of the ribbon placed in the direction of the beam flow. In this way, the mass and rise in temperature can be varied by simply increasing or decreasing the width of the ribbon without intercepting any more or less of the beam passing between parallal ribbon portions. For this case beads 42 are attached to the leading edge of the ribbon instead of being threaded.

The size of the phosphors and the thickness of the wire or ribbon each contribute to the small portion (0.1%) of blockage presented by sensor 16 to the particles in the beam. Thus, it should be apparent that the quantity of phosphors and the thickness of the wire may vary considerably and still be acceptable. However, to achieve efficient sampling with minimum beam interference the particular spacing between wire portions and between beads on the wire portions is defined by the percentage of interference or blockage across the beam path. Blockage of 0.1% or less effectively achieves this efficient results.

The closer the spacing between beads and wire portions the better resolution. An unresolved image of the phosphor provides the spatial intensity distribution of the beam with a spatial resolution that is a function of the number of beads in the beam path. Prior to operation, a known established beam line can be directed through the grid formed by wire 22 for precise calibration of the meter at the energy the particle beam is expected to work. This calibration compensates for the added thermal mass of the phosphor beads attached to the wires, allowing a zeroing of the bridge prior to operation of the system.

Although the present invention has been described with reference to a preferred embodiment, workers skilled in the art will recognize that changes may be made in form and detail without departing from the scope and spirit of the forgoing disclosure. Accordingly, the scope of the invention should be limited only by the claims appended hereto.

We claim:

1. A beam intensity monitor for monitoring high energy particle beams, comprising: an electromagnetic energy sensor disposed in a planar array for simultaneously intercepting small portions of energy across the face of said beam; optical energy detection means focussed in the region of said planar array for detecting fluorescent action indicative of particle spatial distribution; voltage detection means coupled to said sensor for detecting changes in potential occurring on said array; and wherein said sensor is a planar array of thermal resistance wire having a plurality of phosphor beads selectively attached thereto and uniformly disposed across the plane of the array for intercepting less than one percentage of a high energy particle beam directed through the plane of the sensor.

2. A beam intensity monitor for high energy particle beam systems comprising: first, second, third and fourth resistances coupled respectively in series and arranged in the form of a bridge circuit; a direct current power source connected in series with a switch, said power source and switch being coupled in parallal with said first and second series connected resistances and said third and fourth series connected resistances for applying power to the bridge circuit; said fourth resistance being an elongated thermal resistance wire disposed in a plane for receiving electromagnetic radiation impinging on the fourth resistance normal to the plane, said wire changing resistance in response to impinging radiation, said resistance wire being spatially displaced across an area and occupying approximate 0.1% of the area of the plane bounded by the wire, said wire having a plurality of spaced apart phosphors attached thereto, said phosphors fluorescing in response to impinging radiation; and means for detecting said changes in resistance and fluorescing phosphor for providing a measure of the power within and spatial distribution acrods a beam passing through the plane of said thermal resistance wire.

3. A beam intensity monitor as set forth in claim 2 wherein said means for detecting comprises voltage measurement means coupled in parallel with said second and third series connected resistances and said fourth and first series connected resistances for measuring voltage changes across the bridge indicative of thermal changes in said wire for providing a total power measurement.

4. A beam intensity monitor as set forth in claim 3 wherein said means for detecting further comprises a television camera for recording fluorescence and scintillation present on said phosphors indicative of spatial distribution of the particles within the beam.

* * * * *